United States Patent
Cheng (10) Patent No.: US 10,473,214 B2
(45) Date of Patent: Nov. 12, 2019

(54) ELECTRONIC CONTINUOUSLY VARIABLE TRANSMISSION (ECVT) SYSTEM AND CONTROL METHOD FOR THE SAME

(71) Applicant: MOTIVE POWER INDUSTRY CO., LTD., Changhua County (TW)

(72) Inventor: Kai-Wen Cheng, Changhua County (TW)

(73) Assignee: MOTIVE POWER INDUSTRY CO., LTD., Changhua County (TW)

( * ) Notice: Subject to any disclaimer, the term of this patent is extended or adjusted under 35 U.S.C. 154(b) by 20 days.

(21) Appl. No.: 15/916,326

(22) Filed: Mar. 9, 2018

(65) Prior Publication Data

US 2018/0328483 A1 Nov. 15, 2018

(30) Foreign Application Priority Data

May 9, 2017 (TW) .............................. 106115211 A (51) Int. Cl.
*F16H 61/16* (2006.01)
*F16H 61/664* (2006.01)
*F16H 61/04* (2006.01)

(52) U.S. Cl.
CPC ..... *F16H 61/6646* (2013.01); *F16H 61/0437* (2013.01); *F16H 61/6649* (2013.01); *F16H 2061/6643* (2013.01); *F16H 2300/02* (2013.01); *F16H 2306/14* (2013.01); *F16H 2306/30* (2013.01)

(58) Field of Classification Search
CPC ............................ F16H 61/16; F16H 2061/163
See application file for complete search history.

(56) References Cited

U.S. PATENT DOCUMENTS

| 4,781,663 | A | * | 11/1988 | Reswick | ................... | F16H 9/10 |
| | | | | | | 474/49 |
| 9,234,580 | B1 | * | 1/2016 | Usui | ....................... | B62M 25/08 |
| 2006/0003866 | A1 | * | 1/2006 | Unno | ................ | F16H 61/66259 |
| | | | | | | 477/44 |
| 2007/0027602 | A1 | * | 2/2007 | Unno | ................ | F16H 61/66254 |
| | | | | | | 701/51 |
| 2007/0066444 | A1 | * | 3/2007 | Matsudaira | ......... | F16H 61/0213 |
| | | | | | | 477/115 |

(Continued)

FOREIGN PATENT DOCUMENTS

GB 2523321 8/2015

*Primary Examiner* — Tisha D Lewis
(74) *Attorney, Agent, or Firm* — WPAT, PC (57) ABSTRACT

An electronic continuously variable transmission (ECVT) system applicable to a motorcycle includes a first speed sensor, second speed sensor, continuously variable transmission (CVT) and control unit. The control unit receives a user control signal and accordingly controls a speed-changing state of the CVT. While the motorcycle is operating in a manual-operation mode, the control unit predicts, according to the user control signal, a first speed signal sent from the first speed sensor, and a second speed signal sent from the second speed sensor, whether the next gear indicated by the shift request signal will cause the motorcycle to move unsteadily. If so, the control unit ignores the shift request signal and refuses to perform gear shifting. If not, the control unit sends at least a shift control signal to the CVT so that the CVT performs gear shifting.

3 Claims, 5 Drawing Sheets (56) References Cited

U.S. PATENT DOCUMENTS

| | | |
|---|---|---|
| 2007/0186705 A1 | 8/2007 | Suzuki |
| 2008/0077301 A1* | 3/2008 | Suzuki .................... F16H 61/16 |
| | | 701/65 |
| 2009/0247358 A1* | 10/2009 | Kojima ................... F16H 61/16 |
| | | 477/80 |
| 2013/0245900 A1* | 9/2013 | Fukushima .......... B60W 40/112 |
| | | 701/51 |
| 2014/0256507 A1 | 9/2014 | Sakamoto |
| 2015/0051802 A1* | 2/2015 | Saitoh .................... F16H 61/16 |
| | | 701/60 |

* cited by examiner

ELECTRONIC CONTINUOUSLY VARIABLE TRANSMISSION (ECVT) SYSTEM AND CONTROL METHOD FOR THE SAME

CROSS-REFERENCE TO RELATED APPLICATION

This non-provisional application claims priority under 35 U.S.C. § 119(a) on Patent Application No(s). 106115211 filed in Taiwan, R.O.C. on May 9, 2017, the entire contents of which are hereby incorporated by reference.

FIELD OF THE INVENTION

The present invention relates to electronic continuously variable transmission (ECVT) systems and control methods for the same and, more particularly, to an ECVT system with a manual-operation mode and a control method for the same.

BACKGROUND OF THE INVENTION

A continuously variable transmission (CVT) is an uninterrupted transmission system commonly for use in transmission of motorcycles such as scooters. The CVT can be configured to provide a manual-operation mode in which users can carry out manual transmission. However, manual down transmission carried out by users in the manual-operation mode of the CVT is confronted with an increase in speed ratio, which in turn requires a great engine brake; as a result, motorcycles moving on roads with low coefficients of friction or turning are likely to trip.

Therefore, the manual-operation mode of the CVT of motorcycles poses a risk regarding driving safety.

SUMMARY OF THE INVENTION

It is an objective of the present invention to provide an electronic continuously variable transmission (ECVT) system configured to provide a manual-operation mode which poses no driving risk to motorcyclists.

In order to achieve at least the above objective, the present invention provides an electronic continuously variable transmission (ECVT) system applicable to a motorcycle. The ECVT system comprises a first speed sensor, a second speed sensor, a CVT and a control unit. The first speed sensor is disposed in a front portion of the motorcycle to sense a front-wheel speed of the motorcycle and send a first speed signal. The second speed sensor is disposed in the rear portion of the motorcycle to sense the rear-wheel speed of the motorcycle and send a second speed signal. The CVT transforms and transmits the driving power of an engine of the motorcycle to the rear wheel of the motorcycle. The control unit, electrically coupled to the first speed sensor, the second speed sensor and the CVT, is used for receiving a user control signal and accordingly control the speed-changing state of the CVT. While the motorcycle is operating in a manual-operation mode and the user control signal is a shift request signal, the control unit is configured to predict, according to the shift request signal, the first speed signal and the second speed signal, whether the next gear indicated by the shift request signal will cause the motorcycle to move unsteadily. The control unit is configured to ignore the shift request signal such that the CVT does not perform gear shifting if the control unit predicts that the next gear indicated by the shift request signal will cause the motorcycle to move unsteadily. The control unit is configured to send at least a shift control signal to the CVT so that the CVT performs gear shifting if the control unit predicts that the next gear indicated by the shift request signal will not cause the motorcycle to move unsteadily.

In an embodiment of the present invention, the shift request signal indicates a down transmission request, and the control unit is configured to calculate a slip ratio of the next gear indicated by the shift request signal according to the shift request signal, the first speed signal and the second speed signal; and determine whether the slip ratio is greater than a slip ratio threshold so as to predict whether the next gear indicated by the shift request signal will cause the motorcycle to move unsteadily.

In an embodiment of the present invention, if the control unit determines that the slip ratio is greater than or equal to the slip ratio threshold, the control unit will ignore the shift request signal such that the CVT will not perform gear shifting.

In an embodiment of the present invention, if the control unit determines that the slip ratio is less than the slip ratio threshold, the control unit will send the at least a shift control signal to the CVT so that the CVT performs gear shifting according to the shift request signal.

In an embodiment of the present invention, the shift request signal indicates a down transmission request, and the control unit is configured to: set an engine rotation speed threshold according to the shift request signal, the first speed signal, the second speed signal; and determine whether an engine rotation speed of the motorcycle is greater than or equal to the engine rotation speed threshold so as to predict whether the next gear indicated by the shift request signal will cause the motorcycle to move unsteadily. The control unit predicts that the next gear indicated by the shift request signal will cause the motorcycle to move unsteadily if the engine rotation speed is greater than or equal to the engine rotation speed threshold. The control unit predicts that the next gear indicated by the shift request signal will not cause the motorcycle to move unsteadily if the engine rotation speed is less than the engine rotation speed threshold.

In an embodiment of the present invention, the ECVT system further comprises an inclination angle sensor electrically coupled to the control unit, and the control unit sets the engine rotation speed threshold according to a signal sent from the inclination angle sensor.

In order to achieve at least the above objective, the present invention further provides a control method for an electronic continuously variable transmission (ECVT) system, the control method being applicable to a motorcycle, the control method comprising the following steps in a manual-operation mode. (a) A user control signal which is a shift request signal is received. (b) Whether the next gear indicated by the shift request signal will cause the motorcycle to move unsteadily is predicted according to the shift request signal, a first speed signal related to a front portion wheel, and a second speed signal related to a rear wheel. (c) If in step (b) it is predicted that the next gear indicated by the shift request signal will cause the motorcycle to move unsteadily, the shift request signal is ignored such that a CVT of the motorcycle does not perform gear shifting. (d) If in step (b) it is predicted that the next gear indicated by the shift request signal will not cause the motorcycle to move unsteadily, at least a shift control signal is sent to the CVT so that the CVT performs gear shifting.

In an embodiment of the present invention, the shift request signal indicates a down transmission request and the step (b) comprises: calculating a slip ratio of the next gear indicated by the shift request signal according to the shift request signal, the first speed signal and the second speed signal; and determining whether the slip ratio is greater than or equal to a slip ratio threshold so as to predict whether the next gear indicated by the shift request signal will cause the motorcycle to move unsteadily. The step (c) comprises ignoring the shift request signal such that the CVT does not perform gear shifting if the step (b) determines that the slip ratio is greater than or equal to the slip ratio threshold. The step (d) comprises sending the at least a shift control signal to the CVT so that the CVT performs gear shifting according to the shift request signal if the step (b) determines that the slip ratio is less than the slip ratio threshold.

In some embodiments of the present invention, the control method further comprises setting the slip ratio threshold according to at least a state value of the motorcycle, and the at least a state value of the motorcycle indicates at least one state of the motorcycle turning, the motorcycle moving on a low-friction road, and the motorcycle moving on a high-friction road.

In an embodiment of the present invention, the shift request signal indicates a down transmission request, and the step (b) comprises: (b1) setting an engine rotation speed threshold according to the shift request signal, the first speed signal, and the second speed signal; and (b2) determining whether an engine rotation speed of the motorcycle is greater than or equal to the engine rotation speed threshold, so as to predict whether the next gear indicated by the shift request signal will cause the motorcycle to move unsteadily. It is predicted that the next gear indicated by the shift request signal will cause the motorcycle to move unsteadily if the engine rotation speed of the motorcycle is greater than or equal to the engine rotation speed threshold; and it is predicted that the next gear indicated by the shift request signal will not cause the motorcycle to move unsteadily if the engine rotation speed of the motorcycle is less than the engine rotation speed threshold.

In an embodiment of the present invention, the step (b1) comprises: calculating at least a slip ratio of the motorcycle according to the first speed signal and the second speed signal; and setting the engine rotation speed threshold based on determining whether the at least a slip ratio is greater than or equal to a slip ratio threshold. The engine rotation speed threshold is set to a first value if the at least a slip ratio is greater than the slip ratio threshold. The engine rotation speed threshold is set to a second value if the at least a slip ratio is less than or equal to the slip ratio threshold.

In some embodiments of the present invention, the step (b) further comprises setting the engine rotation speed threshold according to an inclination angle of the motorcycle.

Therefore, the ECVT system and its control method of the present invention together provide a manual-operation mode which poses no driving risk to motorcyclists.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
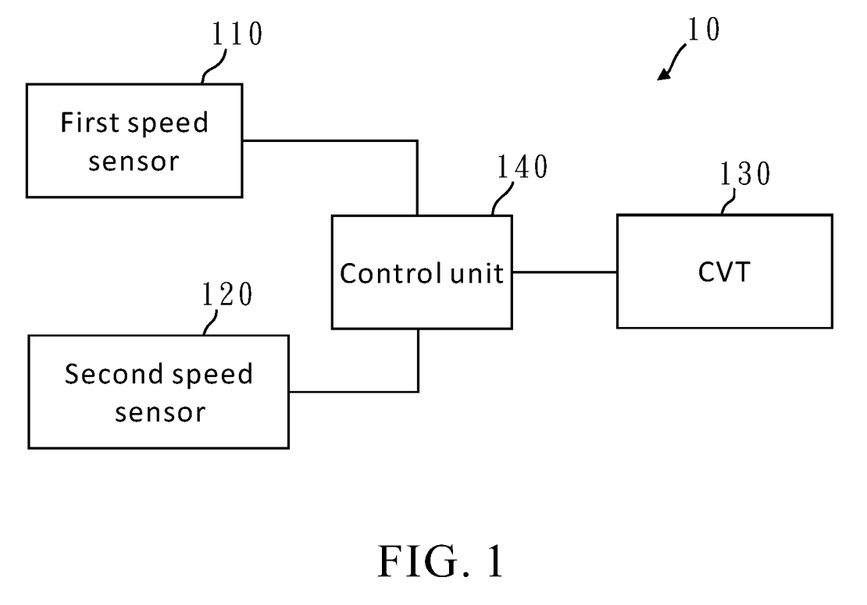
FIG. 1 is a block diagram of an ECVT system according to an embodiment of the present invention.

An electronic continuously variable transmission (ECVT) system is provided according to an embodiment of the present invention. FIG. 1 is a block diagram of an ECVT system 10 according to an embodiment of the present invention. As shown in FIG. 1, the ECVT system 10 is for use with a motorcycle and comprises a first speed sensor 110, a second speed sensor 120, a continuously variable transmission (CVT) 130 and a control unit 140. The ECVT system 10 is applicable to any types of motorcycles, such as lightweight motorcycles, scooters, as well as any two-wheeled or three-wheeled vehicles, using a driving power generated from internal combustion engines or electric motors. For instance, from a perspective of gear shifting, the motorcycle can be configured to either provide an automatic mode and a manual-operation mode for users to choose from or provide the manual-operation mode, but the present invention is not limited thereto.

The first speed sensor 110 is disposed in the front portion of the motorcycle to sense the front-wheel speed of the motorcycle and send a first speed signal. The second speed sensor 120 is disposed in the rear portion of the motorcycle to sense the rear-wheel speed of the motorcycle and send a second speed signal. For instance, the speed sensors or traveling speed sensors are magneto-electric speed sensors, Hall speed sensors or photoelectrical speed sensors, but the present invention is not limited thereto.

The CVT 130 transforms and transmits the driving power of the engine of the motorcycle to the rear wheel of the motorcycle. For instance, the CVT 130 is an electronic continuously variable transmission (ECVT) which comprises two axles. One axle is coupled to the engine of the motorcycle and driven by the engine. The other axle is coupled to the rear wheel shaft of the motorcycle to drive the rear wheel of the motorcycle, but the present invention is not limited thereto. For example, the CVT 130 can be a rubber-containing belt, metallic belt or chained continuously variable transmission, or a frictional disk or conventional heteroaxial continuously variable transmission.

The control unit 140 is electrically coupled to the first speed sensor 110, the second speed sensor 120 and the CVT 130, and is utilized to receive a user control signal and accordingly control the speed-changing state of the CVT 130. The control unit 140 can be implemented by using a processor, a digital signal processor, or a programmable integrated circuit (such as a microcontroller, a field programmable gate array (FPGA) or an application specific integrated circuit (ASIC)), or the control unit 140 can be a dedicated circuit or module, but the present invention is not limited thereto.

In the manual-operation mode of the motorcycle, the user control signal is a shift request signal, whereas the control unit 140 determines, according to the shift request signal, the first speed signal and the second speed signal, whether the next gear indicated by the shift request signal will cause the motorcycle to move unsteadily. If the control unit 140 determines that the next gear indicated by the shift request signal will cause the motorcycle to move unsteadily, the control unit 140 will ignore the shift request signal such that the CVT 130 will not perform gear shifting. If the control unit 140 determines that the next gear indicated by the shift request signal will not cause the motorcycle to move unsteadily, the control unit 140 will send at least a shift control signal to the CVT 130 so as for the CVT 130 to perform gear shifting according to the shift request signal.

For instance, the control unit 140 determines, according to the magnitude of the slip ratio of the next gear indicated by the shift request signal, whether the next gear indicated by the shift request signal will cause the motorcycle to move unsteadily. For instance, at this point in time, if the motorcycle is turning or moving on a road with a low coefficient of friction, the motorcycle will end up with a greater front portion/rear wheel slip ratio than when moving straight ahead or moving on a road with a high coefficient of friction because of reduced contact area between the road surface and the wheels and insufficient friction, accordingly leading to an unsteady drive for reasons, such as a wheel locked instantaneously.

In an embodiment, the shift request signal indicates a down transmission request, whereas the control unit 140 calculates a slip ratio of the next gear indicated by the shift request signal according to the shift request signal, the first speed signal and the second speed signal and determines whether the slip ratio is greater than a slip ratio threshold so as to predict whether the next gear indicated by the shift request signal will cause the motorcycle to move unsteadily. If the control unit 140 determines that the slip ratio is greater than or equal to the slip ratio threshold, the control unit 140 will ignore the shift request signal such that the CVT 130 will not perform gear shifting. If the control unit 140 determines that the slip ratio is less than the slip ratio threshold, the control unit 140 will send the at least a shift control signal to the CVT 130 so as for the CVT 130 to perform gear shifting according to the shift request signal.

Figure 2:
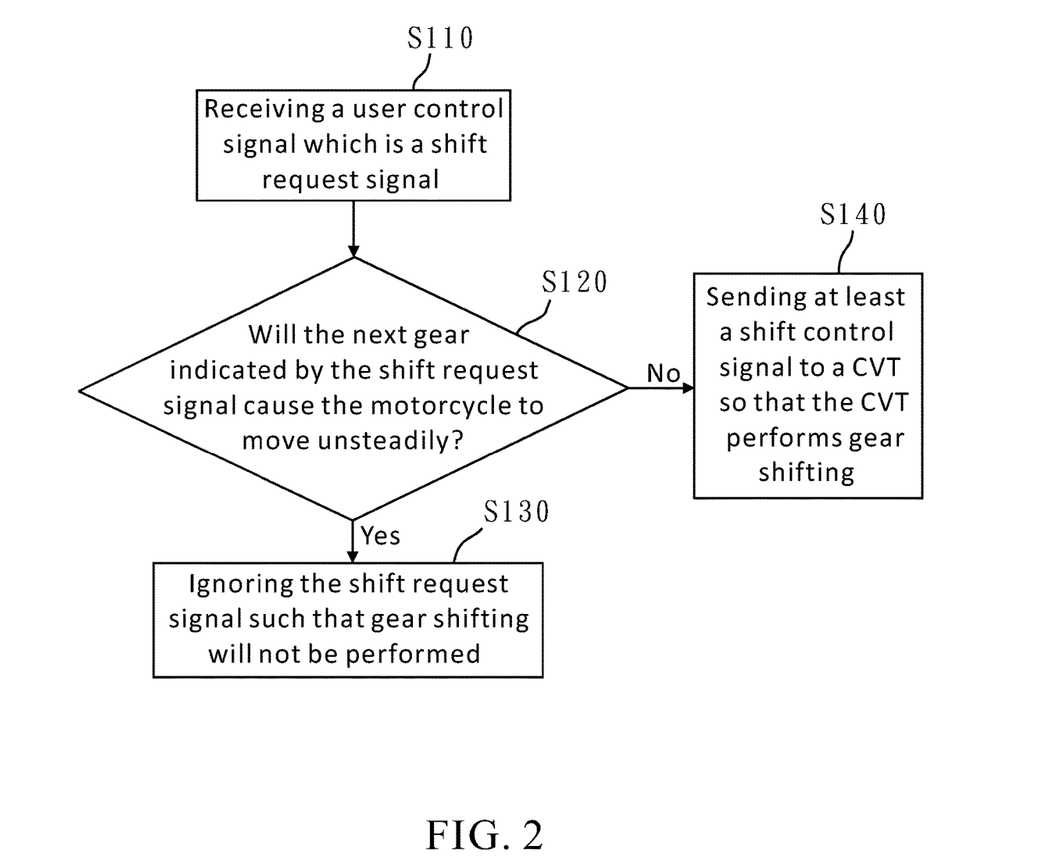
FIG. 2 is a flowchart of a control method for the ECVT system according to an embodiment of the present invention.

The present invention provides, in another embodiment, a control method for the ECVT system 10. FIG. 2 is a flowchart of a control method for the ECVT system 10 according to an embodiment of the present invention. As shown in FIG. 2, the control method comprises the steps, for example, in a manual-operation mode of the motorcycle, and can be carried out by the control unit 140 with a program or firmware or in a programmable manner, but the present invention is not limited thereto.

Figure 3:
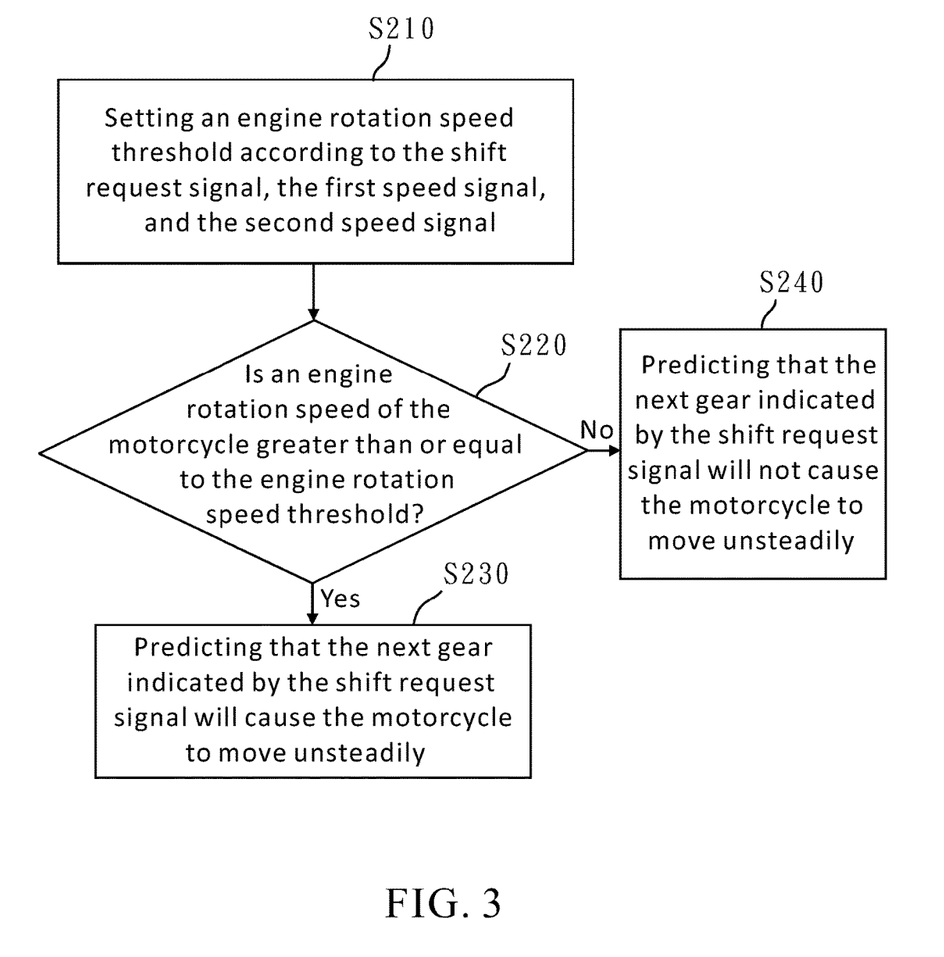
FIG. 3 is a flowchart of step S120 in the control method illustrated by FIG. 2 according to an embodiment of the present invention.

Referring to FIG. 3, as shown in step S110, a user control signal which is a shift request signal is received. For instance, while the motorcycle is operating in the manual-operation mode, a person driving the motorcycle may generate the user control signal by the motorcycle's manual gear shifter, tread-driven gear shifter or any other gear shifter, whereas the control unit 140 of the ECVT system 10 of the motorcycle receives the user control signal.

As shown in step S120, whether the next gear indicated by the shift request signal will cause the motorcycle to move unsteadily is predicted according to the shift request signal, a first speed signal related to the front portion wheel and a second speed signal related to the rear wheel.

In step S130, if step S120 predicts that the next gear indicated by the shift request signal will cause the motorcycle to move unsteadily, the shift request signal will be ignored such that a CVT 130 of the motorcycle will not perform gear shifting.

In step S140, if step S120 predicts that the next gear indicated by the shift request signal will not cause the motorcycle to move unsteadily, at least a shift control signal will be sent to the CVT 130 so that the CVT 130 performs gear shifting according to the shift request signal.

Step S120 of predicting whether the next gear indicated by the shift request signal will cause the motorcycle to move unsteadily can be carried out, provided that various criteria or conditions are met. In this regard, a slip ratio calculated according to a front portion/rear portion speed hereunder serves as a judgment criterion for the sake of illustration, but the present invention is not limited thereto.

In an embodiment, the shift request signal indicates a down transmission request, and step S120 comprises: calculating a slip ratio of the next gear indicated by the shift request signal according to the shift request signal, the first speed signal and the second speed signal; and determining whether the slip ratio is greater than a slip ratio threshold so as to predict whether the next gear indicated by the shift request signal will cause the motorcycle to move unsteadily.

For instance, the slip ratio is defined as follows: $S_p=(V_v-R_w \cdot \omega_w)/V_v$, wherein $V_v$ denotes the speed of a wheel, $R_w$ denotes tire radius, $\omega_w$ denotes tire angular speed. The slip ratio ranges from 0 to 1, expressing the extent to which the tire skids on the ground. If the wheel undergoes no displacement while rotating at high speed, the slip ratio equals 1, indicating that the wheel is skidding fully. If the tangential speed of the tire equals the motorcycle's speed, the slip ratio equals 0, indicating that the wheel is no skidding. Hence, the slip ratio of the next gear indicated by the shift request signal is calculated according to the first speed signal related to the front portion wheel and the second speed signal related to the rear wheel. For example, the slip ratio of the next gear can be indicated by a front portion wheel slip ratio and a rear wheel slip ratio which are calculated according to the first speed signal, the second speed signal, and the speed ratio of the next gear. In another example, the slip ratio of the next gear can be set to the average of the calculated front portion and rear wheel slip ratios. In yet examples, the slip ratio of the next gear can be indicated by a current front portion wheel slip ratio and a current rear wheel slip ratio by calculation; or the slip ratio of the next gear can be indicated by multiplying the average of the current front portion and rear wheel slip ratios with a ratio for changing the speed ratio of gears.

Regarding the judgment criterion based on the slip ratio, for instance, the step S130 is as follows: if it is determined that the slip ratio is greater than or equal to the slip ratio threshold, the shift request signal will be ignored such that the CVT 130 will not perform gear shifting.

Regarding the judgment criterion based on the slip ratio, for instance, the step S140 is as follows: if the control unit determines that the slip ratio is less than the slip ratio threshold, the control unit will send the at least a shift control signal to the CVT 130 so as for the CVT 130 to perform gear shifting according to the shift request signal.

Table 1 below shows the determination results of a down transmission request according to the judgment criterion of the slip ratio and the aforesaid method, wherein it is assumed that the motorcycle moves on a road with a low coefficient of friction, and the slip ratio threshold is set to 20% (i.e., 0.2). Furthermore, M1, M2~M7 denote gear numbers. For example, M1 denotes a low-speed gear with a large speed ratio and a large engine brake, M2 denotes a low-speed gear with a smaller speed ratio than M1, and M7 denotes a high-speed gear with a smaller speed ratio and smaller engine brake than M1~M6. Relationships of M4, M5, M6 are inferred by analogy and thus are not reiterated for the sake of brevity.

TABLE 1

| scenario | shift request signal | estimated slip ratio | Is shift allowed? |
|---|---|---|---|
| 1 | M7 is lowered to M6 | 10% | allowed |
| 2 | M6 is lowered to M5 | 18% | allowed |
| 3 | M5 is lowered to M4 | 26% | Shift is not allowed (or is ignored). |

Table 2 below shows the determination results of a down transmission request according to the judgment criterion of the slip ratio and the aforesaid method, wherein it is assumed that the motorcycle moves on a road with a high coefficient of friction, and the slip ratio threshold is set to 20% (i.e., 0.2). As shown in Table 2, since it is assumed that the motorcycle moves on a road with a high coefficient of friction, the estimated slip ratio in Table 2 is lower than the estimated slip ratio in Table 1.

TABLE 2

| scenario | shift request signal | estimated slip ratio | Is shift allowed? |
|---|---|---|---|
| 1 | M7 is lowered to M6 | 7% | allowed |
| 2 | M6 is lowered to M5 | 13% | allowed |
| 3 | M5 is lowered to M4 | 18% | allowed |

In some other embodiments of the present invention, the ECVT system 10 or its control method is implemented as follows: the slip ratio threshold is set according to at least a state value of the motorcycle, wherein the at least a state value of the motorcycle indicates at least a state of the motorcycle while the motorcycle is turning, moving on a low-friction road, and moving on a high-friction road, respectively. For instance, the ECVT system 10 further comprises a G-sensor or a gyro meter, and the ECVT system 10 uses the control unit 140 or any other controller to determine whether the motorcycle is turning. In addition, the ECVT system 10 can employ any other sensor, such as a rain sensor or a humidity sensor, to measure ambient humidity and thus detect whether the motorcycle is moving on a low-friction road or a high-friction road. For example, if the ECVT system 10 in this embodiment determines that the motorcycle is operating in humid or rainy weather, that is, moving on a road with a low coefficient of friction, the control unit 140 will set the slip ratio threshold (say, from 0.35) to a low slip ratio threshold (say, 0.2). By contrast, if the motorcycle's state value changes, for example, the weather turns dry (when the humidity drops or the rain stops), the control unit 140 will set the slip ratio threshold (say, from 0.2) to a high slip ratio threshold (say, 0.3 or 0.35). Hence, the slip ratio threshold can be adjusted according to a change regarding the environment to not only ensure driving safety but also render driving flexible. However, the present invention is not limited thereto.

In addition, regarding step S120, in addition to the aforesaid judgment criteria based on a slip ratio, the other criteria or conditions can be employed. In the following embodiment, the motorcycle's engine rotation speed is used as a judgment criterion. Because a conventional motorcycle's engine rotation speed is measured with a signal generated from the motorcycle's built-in sensor, such as a crankshaft angle sensor, the details of the engine rotation speed will not be described in detail, for the sake of brevity. In addition, the present invention is not limited thereto.

In an embodiment, as follows, where the motorcycle's engine rotation speed is used as a judgment criterion, the shift request signal indicates a down transmission request.

Referring to FIG. 3, in an embodiment, step S120 of the method can be implemented to include steps S210, S220, S230 and S240.

As show in step S210, an engine rotation speed threshold is set according to the shift request signal, the first speed signal, and the second speed signal.

As shown in step S220, whether an engine rotation speed of the motorcycle is greater than or equal to the engine rotation speed threshold is determined, so as to predict whether the next gear indicated by the shift request signal will cause the motorcycle to move unsteadily.

As shown in step S230, it is predicted that the next gear indicated by the shift request signal will cause the motorcycle to move unsteadily if the engine rotation speed is greater than or equal to the engine rotation speed threshold.

As shown in step S240, it is predicted that the next gear indicated by the shift request signal will not cause the motorcycle to move unsteadily if the engine rotation speed is less than the engine rotation speed threshold.

Figure 4:
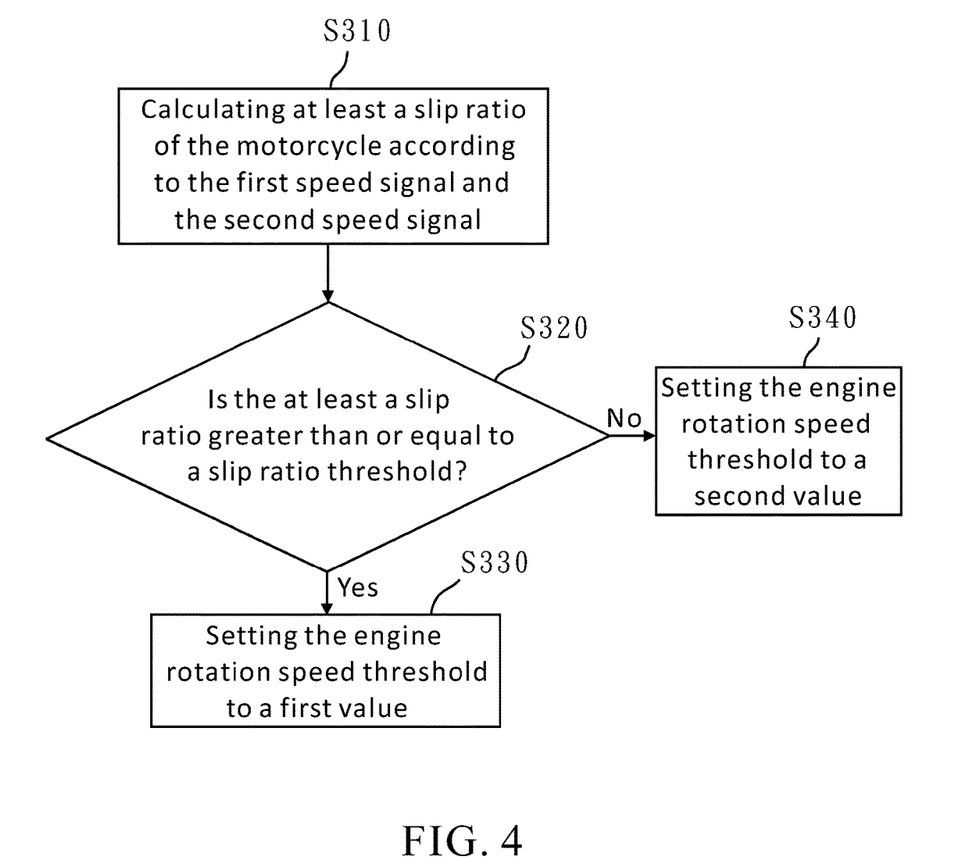
FIG. 4 is a flowchart of step S210 in the control method illustrated by FIG. 3 according to an embodiment of the present invention.

Referring to FIG. 4, in an embodiment, step S210 of the FIG. 3 can be implemented to include steps S310, S320, S330 and S340.

As shown in step S310, at least a slip ratio of the motorcycle is calculated according to the first speed signal and the second speed signal. For example, the at least a slip ratio, including a front portion wheel slip ratio and a rear wheel slip ratio, or the average of the front portion and rear wheel slip ratios, is calculated according to the first speed signal and the second speed signal, respectively.

As shown in step S320, the engine rotation speed threshold is set based on whether the at least a slip ratio is greater than or equal to a slip ratio threshold is determined.

As shown in step S330, the engine rotation speed threshold is set to a first value if the at least a slip ratio (for example, a front portion wheel slip ratio and a rear wheel slip ratio, or the average of the front portion and rear wheel slip ratios) is greater than the slip ratio threshold.

As shown in step S340, the engine rotation speed threshold is set to a second value if the at least a slip ratio is less than or equal to the slip ratio threshold.

Based on the embodiment illustrated by FIG. 4, the method can be implemented and includes: setting the engine rotation speed threshold to different values based on the prediction as to whether the coefficient of friction of the road is high or low (and so on) according to the slip ratio; hence, the embodiment can prevent motorcycle instability which might otherwise happen whenever a driving wheel is locked as a result of an engine brake caused by down transmission. For example, if step S320 determines that the slip ratio is greater than a slip ratio threshold (say, 0.1), it will indicate that the road which the motorcycle is moving on has a low coefficient of friction, and thus the engine rotation speed threshold will be set to a reduced value (say, 7500 RPM). If step S320 determines that the slip ratio is less than the slip ratio threshold (say, 0.1), it will indicate that the road which the motorcycle is moving on has a high coefficient of friction, and thus the engine rotation speed threshold will be set to a large value (say, 8000 RPM).

In some embodiments illustrated by FIG. 3 or FIG. 4, the engine rotation speed threshold is set according to an inclination angle of the motorcycle. For instance, the engine rotation speed threshold thus decreases in response to an increase in an inclination angle of the motorcycle. For instance, the motorcycle's inclination angles of 0°, 25°, and 40° are accompanied by an engine rotation speed threshold of a large value (say, 8000 RPM), an engine rotation speed threshold of a medium value (say, 7600 RPM), and an engine rotation speed threshold of a reduced value (say, 7000 RPM), respectively. Hence, given the embodiments of the motorcycle's inclination angles, the method features determining whether the motorcycle is turning according to the motorcycle's inclination angle, so as to setting the engine rotation speed threshold to different values, with a view to preventing motorcycle instability which might otherwise happen whenever a driving wheel is locked as a result of an engine brake caused by down transmission.

Table 3 below illustrates an embodiment for performing step S120 according to the motorcycle's engine rotation speed and inclination angle. As shown by the embodiment, in different scenarios of gear shifting, a slip ratio threshold varies, and an engine rotation speed threshold varies with the current slip ratio and inclination angle of the motorcycle.

TABLE 3

| | | | engine rotation speed threshold (RPM) | | | |
|---|---|---|---|---|---|---|
| scenario | shift request signal | slip ratio threshold | slip ratio is greater than slip ratio threshold | inclination angle of 0° | inclination angle of 25° | inclination angle of 40° |
| 1 | M7 is lowered to M6 | 10% | 7500 | 8000 | 7600 | 7000 |
| 2 | M6 is lowered to M5 | 10% | 7500 | 8000 | 7600 | 7000 |
| 3 | M5 is lowered to M4 | 15% | 7500 | 8000 | 7600 | 7000 |
| 4 | M4 is lowered to M3 | 15% | 7500 | 8000 | 7600 | 7000 |
| 5 | M3 is lowered to M2 | 18% | 7500 | 8000 | 7600 | 7000 |
| 6 | M2 is lowered to M1 | 21% | 7500 | 8000 | 7600 | 7000 |

As shown in Table 3, if the control unit determines that the slip ratio of the motorcycle is currently greater than the slip ratio threshold and determines that the inclination angle equals 0°, the control unit will determine that the engine rotation speed threshold is of a reduced value (say, 7500 RPM), so as to restrict down transmission. As shown in Table 3, if the control unit determines that the slip ratio of the motorcycle is currently greater than the slip ratio threshold and determines that the inclination angle is greater than 0°, the control unit will determine that the engine rotation speed threshold is of the least value (say, 7500 RPM, even when the inclination angle equals 25°), so as to restrict down transmission. As shown in Table 3, if the control unit determines that the slip ratio of the motorcycle is currently less than or equal to the slip ratio threshold, the control unit will determine the engine rotation speed threshold according to the inclination angle, so as to restrict down transmission. Hence, the present invention precludes motorcycle instability. If the inclination angle falls between 0° and 25° or between 25° and 40° (or is of a value that exists in plurality), the engine rotation speed threshold will be determined by table lookup, averaging, interpolation or a piecewise continuous function, but the present invention is not limited thereto.

In some embodiments, the aforesaid parameters, such as the slip ratio threshold, engine rotation speed threshold, first value, and/or second value, are variable parameters/is a variable parameter. In some embodiments, at least a state value of the motorcycle is that the motorcycle is turning, moving on a low-friction road, or moving on a high-friction road. However, the present invention is not limited thereto.

Figure 5:
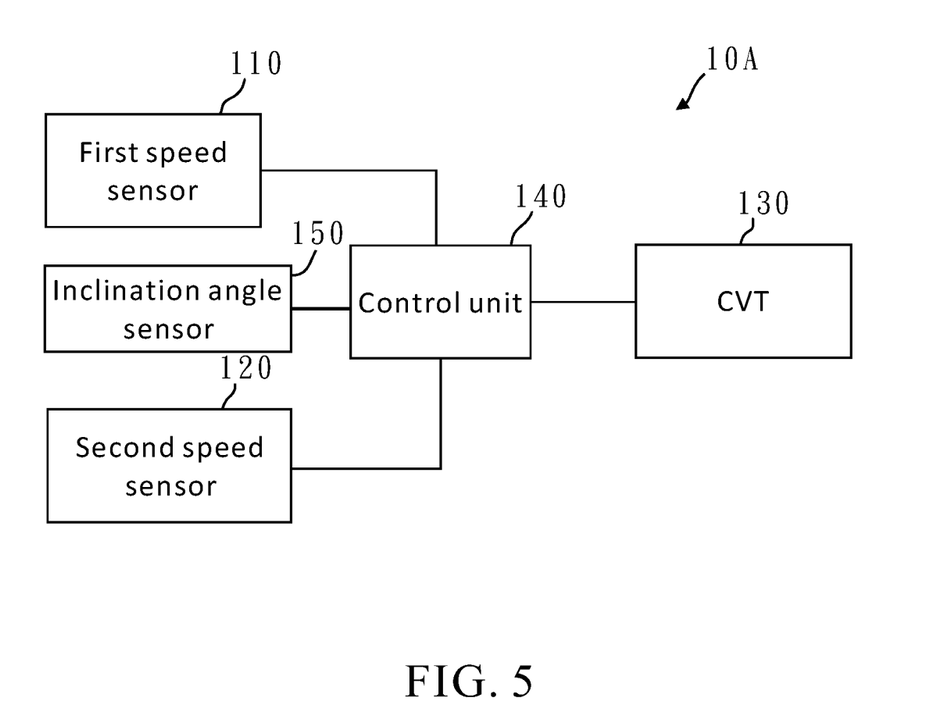
FIG. 5 is a block diagram of the ECVT system according to another embodiment of the present invention.

FIG. 5 is a block diagram of the ECVT system according to another embodiment of the present invention. As shown in FIG. 5, the ECVT system 10A of FIG. 5 is distinguished from the ECVT system 10 of FIG. 1 as follows: the ECVT system 10A further comprises at least an inclination angle sensor 150 electrically coupled to the control unit 140. For example, the inclination angle sensor 150 is disposed centrally at the motorcycle, near the motorcyclist, or at any position conducive to the sensing of the inclination angle of the motorcycle. The ECVT system 10A is applicable to any one of the aforesaid embodiments, wherein the control unit 140 detects the inclination angle of the motorcycle according to a signal sent from the inclination angle sensor 150 and thus sets the engine rotation speed threshold. The inclination angle sensor 150 is provided in the form of a solid, liquid, or gaseous inclination angle sensor, but the present invention is not limited thereto.

Therefore, the above embodiments of the ECVT system and its control method together provide a manual-operation mode which poses no driving risk to motorcyclists. In some embodiments, it is feasible to restrict manual down transmission which might otherwise occur in different scenarios, so as to prevent motorcycle instability which might otherwise happen whenever a driving wheel is locked as a result of an engine brake caused by down transmission.

The present invention is disclosed above by preferred embodiments. However, persons skilled in the art should understand that the preferred embodiments are illustrative of the present invention only, but shall not be interpreted as restrictive of the scope of the present invention. Hence, all equivalent modifications and replacements made to the aforesaid embodiments shall fall within the scope of the present invention. Accordingly, the legal protection for the present invention shall be defined by the appended claims.

What is claimed is:

1. An electronic continuously variable transmission (ECVT) system, applicable to a motorcycle, the ECVT system comprising:
a first speed sensor, disposed in a front portion of the motorcycle, to sense a front-wheel speed of the motorcycle and send a first speed signal;
a second speed sensor, disposed in a rear portion of the motorcycle, to sense a rear-wheel speed of the motorcycle and send a second speed signal;

a continuously variable transmission (CVT) for transforming and transmitting a driving power of an engine of the motorcycle to a rear wheel of the motorcycle; and a control unit, electrically coupled to the first speed sensor, the second speed sensor and the CVT, to receive a user control signal and accordingly control a speed-changing state of the CVT, wherein, in a manual-operation mode of the motorcycle, the user control signal is a shift request signal, and the control unit is configured to:

predict, according to the shift request signal, the first speed signal and the second speed signal, whether a next gear indicated by the shift request signal will cause the motorcycle to move unsteadily, ignore the shift request signal such that the CVT does not perform gear shifting if the control unit predicts that the next gear indicated by the shift request signal will cause the motorcycle to move unsteadily, and send at least a shift control signal to the CVT so that the CVT performs gear shifting if the control unit predicts that the next gear indicated by the shift request signal will not cause the motorcycle to move unsteadily;

wherein the shift request signal indicates a down transmission request, and the control unit is configured to:

set an engine rotation speed threshold according to the shift request signal, the first speed signal, and the second speed signal; and determine whether an engine rotation speed of the motorcycle is greater than or equal to the engine rotation speed threshold so as to predict whether the next gear indicated by the shift request signal will cause the motorcycle to move unsteadily;

wherein the control unit predicts that the next gear indicated by the shift request signal will cause the motorcycle to move unsteadily if the engine rotation speed of the motorcycle is greater than or equal to the engine rotation speed threshold; and the control unit predicts that the next gear indicated by the shift request signal will not cause the motorcycle to move unsteadily if the engine rotation speed of the motorcycle is less than the engine rotation speed threshold;

wherein the ECVT system further comprises an inclination angle sensor electrically coupled to the control unit, and the control unit sets the engine rotation speed threshold based on a signal sent from the inclination angle sensor.

2. A control method for an electronic continuously variable transmission (ECVT) system, the control method being applicable to a motorcycle, the control method comprising:

in a manual-operation mode:

(a) receiving a user control signal which is a shift request signal;

(b) predicting, according to the shift request signal, a first speed signal related to a front portion wheel, and a second speed signal related to a rear wheel, whether a next gear indicated by the shift request signal will cause the motorcycle to move unsteadily;

(c) ignoring the shift request signal such that a continuously variable transmission (CVT) of the motorcycle does not perform gear shifting if it is predicted that the next gear indicated by the shift request signal will cause the motorcycle to move unsteadily; and (d) sending at least a shift control signal to the CVT so that the CVT performs gear shifting if it is predicted that the next gear indicated by the shift request signal will not cause the motorcycle to move unsteady;

wherein the shift request signal indicates a down transmission request, and the step (b) comprises:

(b1) setting an engine rotation speed threshold according to the shift request signal, the first speed signal, and the second speed signal; and (b2) determining whether an engine rotation speed of the motorcycle is greater than or equal to the engine rotation speed threshold, so as to predict whether the next gear indicated by the shift request signal will cause the motorcycle to move unsteadily;

wherein it is predicted that the next gear indicated by the shift request signal will cause the motorcycle to move unsteadily if the engine rotation speed of the motorcycle is greater than or equal to the engine rotation speed threshold; and it is predicted that the next gear indicated by the shift request signal will not cause the motorcycle to move unsteadily if the engine rotation speed of the motorcycle is less than the engine rotation speed threshold;

wherein the step (b) further comprises setting the engine rotation speed threshold according to an inclination angle of the motorcycle.

3. The control method of claim 1, wherein the step (b1) comprises:

calculating at least a slip ratio of the motorcycle according to the first speed signal and the second speed signal;

setting the engine rotation speed threshold based on determining whether the at least a slip ratio is greater than or equal to a slip ratio threshold; and setting the engine rotation speed threshold to a first value if the at least a slip ratio is greater than the slip ratio threshold and to a second value if the at least a slip ratio is less than or equal to the slip ratio threshold.

\* \* \* \* \*